(12) United States Patent
Ricard et al.

(10) Patent No.: US 12,067,695 B2
(45) Date of Patent: Aug. 20, 2024

(54) METHOD AND DEVICE FOR ENCODING/DECODING THE GEOMETRY OF A POINT CLOUD

(71) Applicant: INTERDIGITAL VC HOLDINGS, INC., Wilmington, DE (US)

(72) Inventors: Julien Ricard, Plouer-sur-Rance (FR); Celine Guede, Cesson-Sevigne (FR); Jean-Claude Chevet, Betton (FR); David Gendron, Chevaigne (FR); Yannick Olivier, Thorigne-Fouillard (FR); Joan Llach, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/132,939

(22) Filed: Apr. 10, 2023

(65) Prior Publication Data

US 2023/0245268 A1 Aug. 3, 2023

Related U.S. Application Data

(63) Continuation of application No. 17/259,058, filed as application No. PCT/US2019/039784 on Jun. 28, 2019, now Pat. No. 11,625,809.

(30) Foreign Application Priority Data

Jul. 11, 2018 (EP) .................................. 18305935
Jan. 17, 2019 (EP) .................................. 19305057

(51) Int. Cl.
G06T 3/4007 (2024.01)
G06T 3/06 (2024.01)
G06T 9/00 (2006.01)

(52) U.S. Cl.
CPC .............. *G06T 3/4007* (2013.01); *G06T 3/06* (2024.01); *G06T 9/001* (2013.01)

(58) Field of Classification Search
CPC ..... G06T 3/4007; G06T 3/0031; G06T 9/001; G06T 9/00; G06T 2207/10028;
(Continued)

(56) References Cited

U.S. PATENT DOCUMENTS 8,724,692 B2 5/2014 Lainema et al.
11,284,091 B2 * 3/2022 Tourapis .............. H04N 19/124
(Continued)

FOREIGN PATENT DOCUMENTS

CN 102783151 A 11/2012
CN 103389136 B * 6/2016
(Continued)

OTHER PUBLICATIONS

Han et al., Three-dimensional reconstruction method based on colorful structured light, Journal of Jilin University (Engineering and Technology Edition), vol. 43, No. 45 (Sep. 30, 2013).
(Continued)

*Primary Examiner* — Charles T Shedrick
(74) *Attorney, Agent, or Firm* — Volpe Koenig

(57) ABSTRACT

The present embodiments relate to a method and device. The method comprises obtaining at least one first point from at least one point of a point cloud by projecting said point of the point cloud onto a projection plane and obtaining at least one other point of the point cloud determined according to said at least one first point; determining and encoding at least one interpolation coding mode for said at least one first point based on at least one reconstructed point obtained from said at least one first point and at least one interpolation point defined by said at least one interpolation coding mode to approximate said at least one other point of the point cloud;
(Continued)

and signaling said at least interpolation coding mode as values of image data.

21 Claims, 9 Drawing Sheets

(58) Field of Classification Search
CPC .... H04N 19/00; H04N 13/161; H04N 19/147; H04N 19/597
See application file for complete search history.

(56) References Cited

U.S. PATENT DOCUMENTS

| | | | |
|---|---|---|---|
| 11,551,408 | B2 | 1/2023 | Sugio et al. |
| 2019/0087979 | A1* | 3/2019 | Mammou ............ H04N 19/597 |
| 2020/0014940 | A1* | 1/2020 | Dawar .................... G06T 9/001 |

FOREIGN PATENT DOCUMENTS

| | | | |
|---|---|---|---|
| CN | 103389136 B | | 6/2016 |
| EP | 3594904 A1 | * | 1/2020 |
| EP | 3594904 A1 | | 1/2020 |
| JP | 2002-199393 A | | 7/2002 |
| WO | 2018/123801 A1 | | 5/2018 |
| WO | 2019142164 A1 | | 7/2019 |
| WO | 2019199512 A1 | | 10/2019 |
| WO | 2020014408 A1 | | 1/2020 |

OTHER PUBLICATIONS

He et al, Best-Effort Projection Based Attribute Compression for 3D Point Cloud, Institute of Electrical and Electronics Engineers (IEEE), 2017 23rd Asia-Pacific Conference on Communications (APCC), Perth, Australia, 6 pages (Dec. 11, 2017).
Wu et al, Method of integrating laser-point cloud and digital image based on mobile platform, Journal of Capital Normal University (Natural Science Edition), vol. 32, No. 4, (Aug. 31, 2011).
Guede et al., "Geometry Image Coding Improvements", International Organization for Standardization, ISO/EC JTC1/SC29/WG11, Coding of Moving Picture and Audio, Document MPEG2016/M42111, Gwangju, Korea, Jan. 2018, 15 pages.
Sheikhi-Pour et al., "CE2.11 Out of Loop Geometry Interpolation", International Organziation for Standardization, ISO/IEC JTC/SC29/WG11, Coding of Moving Picture and Audio, Document MPEG2018/m43481, Ljubljana, Slovenia, Jul. 2018, 4 pages.
Zakharchenko et al., "V-PCC Codec Description", international Organization for Standardization, ISO/IEC JTC1/SC29/WG11, Document N18017, Macau, China, Oct. 2018, 33 pages.
Guede et al., PCC CE2.11a Proponent Report on Spatially Adaptive Interpolation for Geometry and Color in VTM2, international Organization for Standardization, ISO/IEC JTC1/SC29/WG11, Document. MPEG2018/m44776, 124th Meeting, Macao, China, Oct. 2018, 6 pages.
Anonymous, "Reference software for ITU-T H.265 High Efficiency Video Coding", Telecommunication Standardization Sector of ITU, Series H: Audiovisual and Multimedia Systems, Infrastructure of audiovisual services—Coding of moving video, Recommendation H.265.2, Oct. 2014, 12 pages.
Asserre et al., "Technicolor's Response to the CFP for Point Cloud Compression", International Organization for Standardization, ISO/IEC JTC1/SC29/WG11, Document MPEG2017/m41822, Macau, China, Oct. 2017, 10 pages.
Zakharchenko, Vladyslav, "Algorithm Description of Mpeg-pcc-tmc2", International Organization for Standardization, ISO/IEC JTC1/SC29/WG11, Document. MPEG2018/N17767, Ljubljana, Slovenia, Jul. 2018, 22 pages.
Guede et al., "Improvement on PLRM Metadata Coding using Neighborhood", International Organization for Standardization, ISO/IEC JTC1/SC29/WG11, MPEG2018/m46095, 125th Meeting, Marrakesh, Morocco, Jan. 2019, 4 pages.
Guede et al., "PCC CE2.5 Report on Optimizations for Depth €magel Geometry Information", international Organization for Standardization, ISO/IEC JTC1/SC29/WG11, Document m42626, San Diego, California, United States, Apr. 2018, 20 pages.
Mammou, K. (Ed.), "PCC Test Model Category 2 v0", International Organization for Standardization, ISO/IEC JTC1/ SC29/WG11, Coding of Moving Picture and Audio, Document N17248, Macau, China, Oct. 2017, 11 pages.
Guede et al., "Spatially Adaptive Geometry and Texture Interpolation", International Organization for Standardization, ISO/IEC JTC1/SC29/WG11. Coding of Moving Picture and Audio, Document m43858, 123rd Meeting, Ljubljana, Slovenia, Jul. 2018, 5 pages.

* cited by examiner

| Reconstruction Coding Mode | 1 | 2 | 3 | 4 | 5 | 6 | 7 | 8 | 9 | 10 |
|---|---|---|---|---|---|---|---|---|---|---|
| MinD1 | 0 | 0 | 0 | 0 | 0 | 1 | 1 | 1 | 1 | 1 |
| Filling | 0 | 0 | 1 | 0 | 1 | 0 | 0 | 1 | 0 | 0 |
| Interpolation | 0 | 1 | 1 | 2 | 2 | 0 | 1 | 1 | 2 | 2 |
| Average R01 | 24.71% | 7.30% | 2.72% | 23.36% | 19.02% | 15.03% | 0.86% | 1.24% | 2.66% | 3.04% |
| Average R02 | 24.01% | 8.12% | 3.40% | 26.98% | 22.15% | 10.85% | 0.77% | 1.41% | 0.85% | 1.46% |
| Average R03 | 22.10% | 10.02% | 4.36% | 29.51% | 24.20% | 6.97% | 0.36% | 1.64% | 0.11% | 0.74% |
| Average R04 | 20.37% | 11.67% | 4.86% | 30.35% | 24.81% | 5.48% | 0.20% | 1.57% | 0.07% | 0.51% |
| Average R05 | 18.95% | 12.61% | 5.55% | 29.14% | 26.34% | 4.78% | 0.09% | 2.02% | 0.05% | 0.48% |
| Average AI | 22.30% | 9.89% | 4.14% | 27.83% | 23.20% | 8.61% | 0.48% | 1.59% | 0.73% | 1.28% |
| Average R4 | 21.77% | 10.00% | 4.21% | 27.91% | 23.41% | 8.66% | 0.48% | 1.60% | 0.76% | 1.21% |
| Average | 22.03% | 9.94% | 4.18% | 27.87% | 23.30% | 8.63% | 0.46% | 1.60% | 0.75% | 1.25% |

FIG. 12

Example of distribution of the use of reconstruction modes in TMC2 regarding rates and configurations

| 0 | 0 | 0 | 1 | 1 | 0 | 0 | 1 |
|---|---|---|---|---|---|---|---|
| 0 | 0 | 1 | 1 | 1 | 1 | 1 | 1 |
| 0 | 0 | 0 | 1 | 1 | 1 | 1 | 1 |
| 0 | 0 | 0 | 0 | 0 | 1 | 1 | 0 |
| 0 | 0 | 0 | 1 | 1 | 1 | 1 | 1 |
| 0 | 0 | 0 | 1 | 1 | 1 | 1 | 1 |
| 0 | 0 | 0 | 1 | 1 | 1 | 1 | 1 |
| 0 | 0 | 0 | 0 | 1 | 1 | 1 | 1 |

Current TMC2 Occupancy map image

Fig.13

| 0 | 0 | 0 | 7 | 2 | 0 | 0 | 2 |
|---|---|---|---|---|---|---|---|
| 0 | 0 | 7 | 7 | 2 | 2 | 2 | 2 |
| 0 | 0 | 0 | 7 | 2 | 2 | 2 | 2 |
| 0 | 0 | 0 | 0 | 0 | 2 | 2 | 0 |
| 0 | 0 | 0 | 5 | 1 | 1 | 1 | 1 |
| 0 | 0 | 0 | 5 | 1 | 1 | 1 | 1 |
| 0 | 0 | 0 | 5 | 1 | 1 | 1 | 1 |
| 0 | 0 | 0 | 0 | 1 | 1 | 1 | 1 |

Occupancy map with PLRM (16*16 precision)

Fig.13a

| 0 | 0 | 0 | 7 | 2 | 0 | 0 | 2 |
|---|---|---|---|---|---|---|---|
| 0 | 0 | 7 | 7 | 7 | 2 | 2 | 2 |
| 0 | 0 | 0 | 2 | 2 | 2 | 1 | 1 |
| 0 | 0 | 0 | 0 | 0 | 1 | 1 | 0 |
| 0 | 0 | 0 | 5 | 5 | 1 | 1 | 1 |
| 0 | 0 | 0 | 5 | 5 | 1 | 1 | 1 |
| 0 | 0 | 0 | 5 | 5 | 5 | 1 | 1 |
| 0 | 0 | 0 | 0 | 5 | 5 | 1 | 1 |

Occupancy map with reconstruction coding mode (4*4 precision)

Fig.13b

METHOD AND DEVICE FOR ENCODING/DECODING THE GEOMETRY OF A POINT CLOUD

CROSS REFERENCE TO RELATED APPLICATIONS

This application is a continuation of U.S. patent application Ser. No. 17/259,058 filed Jan. 8, 2021, which is a 371 National Stage Entry of PCT/US2019/039784 filed Jun. 28, 2019, which claims the benefit of European Patent Application No. 19305057.2 filed Jan. 17, 2019, and European Patent Application No. 18305935.1 filed Jul. 11, 2018, which are incorporated by reference as if fully set forth.

FIELD

The present embodiments generally relate to coding and decoding of a point cloud representing the external surface of a 3D object. Particularly, but not exclusively, the technical field of the present embodiments are related to encoding/decoding of the geometry of such a point cloud.

BACKGROUND

The present section is intended to introduce the reader to various aspects of art, which may be related to various aspects of the present embodiments that are described and/or claimed below. This discussion is believed to be helpful in providing the reader with background information to facilitate a better understanding of the various aspects of the present embodiments. Accordingly, it should be understood that these statements are to be read in this light, and not as admissions of prior art.

A point cloud is a set of data points in some coordinate system. In a three-dimensional coordinate system (3D space), these points are usually intended to represent the external surface of a 3D object. Each point of a point cloud is often defined by its location (X, Y, and Z coordinates in the 3D space) and possibly by other associated attributes such as a color, represented in the RGB or YUV color space for example, a transparency, a reflectance, a two-component normal vector, etc.

It is usual to represent a point cloud as a set of 6-components points (X, Y, Z, R, G, B) or equivalently (X, Y, Z, Y, U, V) where (X,Y,Z) defines the coordinates of a colored point in a 3D space and (R,G,B) or (Y,U,V) defines a color of this colored point.

Point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of set of points.

Practically, point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored and huge.

Automotive industry and autonomous car are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the Lidar as this attribute is a good information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

Point cloud compression will succeed in storing/transmitting 3D objects for immersive worlds only if the size of the bitstream is low enough to allow a practical storage/transmission to the end-user.

It is crucial to be able to distribute dynamic point clouds to the end-user with a reasonable consumption of bit-rate while maintaining an acceptable (or preferably very good) quality of experience. Efficient compression of these dynamic point clouds is a key point in order to make the distribution chain of immersive worlds practical.

Image-based point cloud compression techniques are becoming increasingly popular due to their combination of compression efficiency and low complexity. They proceed in two main steps: first, they project (orthogonal projection) the point cloud, i.e. the 3D points, onto 2D images. For example, at least one depth image represents the geometry of the point cloud, i.e. the spatial coordinates of the 3D points in a 3D space and at least one texture image represents an attribute associated with the 3D points of the point cloud, e.g. a texture/color information associated to those 3D points. Next, these techniques encode such depth and texture images with legacy video encoders.

Image-based point cloud compression techniques achieve good compression performance by leveraging the performance of 2D video encoder, like for example HEVC ("ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), while at the same time, they keep complexity low by using simple projection schemes.

One of the challenges of image-based point cloud compression techniques is that a point cloud may not be suitable for projection onto images, especially when the point distribution follows a surface with many folds (concave/convex regions, like in clothing) or when the point distribution does not follow a surface at all (like in fur or hair). In these situations, image-based point cloud compression techniques suffer from low compression efficiency (many small projections are required, reducing the efficiency of the 2D video compression) or bad quality (due to the difficulty of projecting the point cloud onto a surface).

One of the approaches used in the state of the art to alleviate this problem consists in projecting multiple geometry and texture information onto a same spatial location (pixel) of an image. This means that several depth and/or texture images may be generated per 3D point of the point cloud.

This is the case, for example, of the so-called Test Model Category 2-point cloud encoder (TMC2) as defined in ISO/IEC JTC1/SC29/VVG11/N17248, Macau, China, October 2017, in which the point cloud is orthogonally projected onto a projection plane. Two depth values are then associated per coordinate of said projection plane: one representative of the depth value associated with the nearest point (smallest depth value) and another representative of the depth value of the farthest point (largest depth value). A first depth image is then generated from the smallest depth values (D0) and a second depth image is generated from the absolute value of the largest depth value (D1) with D1−D0 lower than or equal to a maximum surface thickness.

The depth images and associated metadata are then encoded and decoded. The geometry of the point cloud is then reconstructed from the two decoded depth images. But, the coding efficiency of said two depth images should be increased for reducing the global coding cost of a point cloud.

SUMMARY

The following presents a simplified summary of the present embodiments in order to provide a basic understanding of some aspects of the present embodiments. This summary is not an extensive overview of the present embodiments. It is not intended to identify key or critical elements of the present embodiments. The following summary merely presents some aspects of the present embodiments in a simplified form as a prelude to the more detailed description provided below.

The present embodiments set out to remedy at least one of the drawbacks of the prior art with a method comprising: 020 obtaining at least one first point from at least one point of a point cloud by projecting said point of the point cloud onto a projection plane and obtaining at least one other point of the point cloud determined according to said at least one first point; 021 determining and encoding at least one interpolation coding mode for said at least one first point based on at least one reconstructed point obtained from said at least one first point and at least one interpolation point defined by said at least one interpolation coding mode to approximate said at least one other point of the point cloud; and signaling said at least interpolation coding mode as values of image data.

The specific nature of the present embodiments as well as other objects, advantages, features and uses of the present embodiments will become evident from the following description of examples taken in conjunction with the accompanying drawings.

BRIEF DESCRIPTION OF DRAWINGS

In the drawings, examples of the present embodiments are illustrated. It shows:

FIG. 12 illustrates Example of distribution of the use of reconstruction modes in TMC2; and FIGS. 13-13b illustrate examples of occupancy maps.

Similar or same elements are referenced with the same reference numbers.

DESCRIPTION OF EXAMPLE OF THE PRESENT EMBODIMENTS

Figure 1:
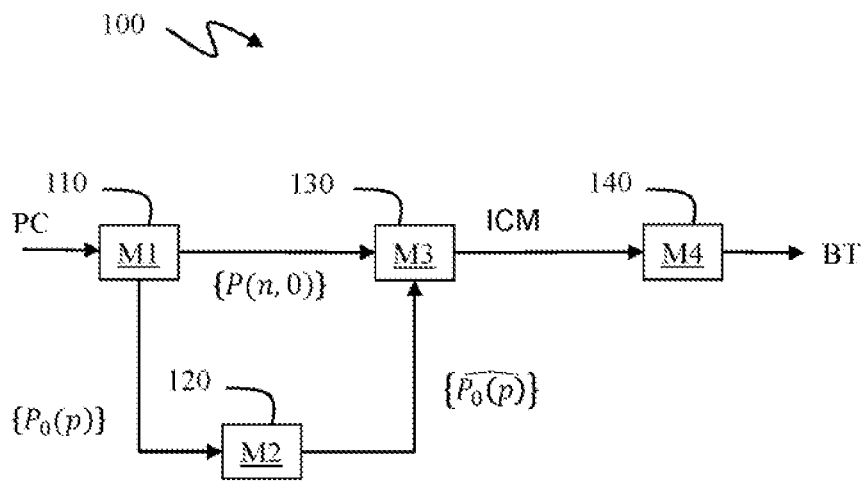
FIG. 1 shows schematically a diagram of the steps of the method 100 for encoding depth values of points of a point cloud in accordance with an example of the present embodiments.

The present embodiments will be described more fully hereinafter with reference to the accompanying figures, in which examples of the present embodiments are shown. The present embodiments may, however, be embodied in many alternate forms and should not be construed as limited to the examples set forth herein. Accordingly, while the present embodiments are susceptible to various modifications and alternative forms, specific examples thereof are shown by way of examples in the drawings and will herein be described in detail. It should be understood, however, that there is no intent to limit the present embodiments to the particular forms disclosed, but on the contrary, the specification is to cover all modifications, equivalents, and alternatives falling within the spirit and scope of the present embodiments as defined by the claims.

The terminology used herein is for the purpose of describing particular examples only and is not intended to be limiting of the present embodiments. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present embodiments.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present embodiments. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or subcombination.

The present embodiments are described for encoding/decoding two depth images and two texture images representative of a point cloud but extends to the encoding/decoding of two sequences (video) of depth images and two sequences (video) of texture images representative of a sequence of point clouds (temporally dynamic point cloud) because the geometry (two depth images) and texture (color) of a point cloud of the sequence of point clouds is then encoded/decoded independently of the geometry (two depth images) and texture (color) of another point cloud of the sequence of point clouds.

As explained above, a point cloud is orthogonally projected onto a projection plane and two depth images D0 and D1 are obtained from the depth values associated with said projected 3D points. D0 is the first depth image that represents the depth values of the nearest points of the point cloud and D1 is the second depth image that represents the depth values of farthest points of the point cloud. The first depth image D0 is encoded using for example a legacy image/video encoder.

In the following, the term "image region" designates a set of pixels of at least one image. These pixels may or not be adjacent pixels and/or belong or not of a same image but all of them share at least one common property.

For example, a whole image itself may be considered as being an image region. An image may also be split into multiple blocks and a block or a group of blocks is then an image region.

An image region may also have a non-rectangular shape. This is the case, for example, when pixels of an image which have a same (or similar) extracted feature are associated to form an image region. An image region may be a patch as defined in TMC2.

Examples of feature extracted from an image may be a color, texture, normal vector, etc.

FIG. 1 shows schematically a diagram of the steps of the method 100 for encoding depth values of points of a point cloud in accordance with an example of the present embodiments.

In step 110, a module M1 obtains at least one first point P0(p) from at least one point of the point cloud PC by projecting said at least one point of the point cloud PC onto a projection plane.

For example, an orthogonal projection may be used.

For each first point P0(p), in step 100, the module M1 also obtains at least one other point P(n,0) of the point cloud PC determined according to said first point P0(p). A point P(n,0) designates a point n from a set of N points and the index 0 refers to the first point P0(p).

According to an embodiment of step 110, at least one other point P(n,0) of the point cloud PC relative to a first point P0(p) belongs to a neighborhood around said first point P0(p).

According to an embodiment, a neighborhood relative to a first point P0(p) comprises points of the point cloud PC which are close said first point P0(p), e.g. when a spatial distance between these points and the first point P0(p) is below a given value.

According to embodiment, the points of the neighborhood are all aligned with the first point P0(p).

According to an embodiment, the neighborhood associated with a first point P0(p) is defined according to an interpolation coding mode ICM determined for said first point P0(p).

Defining a neighborhood means defining the number of its elements, the spatial distance, etc. . . . .

According to an embodiment, the neighborhood associated with a first point P0(p) is an image region around this first point P0(p).

In step 120, a module M2 obtains at least one reconstructed point $\overline{P_0(p)}$ obtained from said at least one first point P0(p).

According to an embodiment of step 120, at least one reconstructed point $\overline{P_0(p)}$ is obtained by encoding and decoding a first point P0(p).

In step 130, a module M3 determines at least one interpolation coding mode ICM for said at least one first point P0(p) based on at least one reconstructed point $\overline{P_0(p)}$ obtained from said at least one first point P0(p) (step 120) and at least one interpolation point PI(i,0) defined by said at least one interpolation coding mode ICM to approximate said at least one other point P(n,0) of the point cloud PC.

An interpolation point P1(i,0) designates an interpolation point i from a set of I interpolation points relative to a first point P0(p) (index 0).

In step 140, a module M4 encodes said at least one first point P0(p) and said at least one interpolation coding mode ICM in the bitstream BT.

According to an embodiment of step 120 or 140, depth values of said at least one first point P0(p) are assigned to a first depth image D0 which is encoded by legacy image encoder in a bitstream BT, such as a HEVC encoder/decoder or the encoder/decoder as specified by TMC2.

According to this embodiment in step 120, a decoded first depth image $\overline{D_0}$ is obtained by decoding the first depth image D0 and said at least one reconstructed point $\overline{P_0(p)}$ is a pixel of the decoded first depth image $\overline{D_0}$.

According to an embodiment of step 130, determining an interpolation coding mode ICM for a first point P0(p) is based on a rate-distortion cost $RDC_k$ associated with at least one candidate interpolation coding mode $CICM_k$ indicating a particular encoding of at least one other point P(n,0) (n=1, ..., N) associated with a first point P0(p) by at least one interpolation point $PI_k(i,0)$ (i=1, ..., $I_k$) defined according to a candidate interpolation coding mode $CICM_k$.

An interpolation point PIk(i,0) designates an interpolation point i from a set of $I_k$ interpolation points relative to a first point P0(p) (index 0), $I_k$ being an integer value defined according to a candidate interpolation coding mode $CICM_k$.

According to an embodiment of step 130, a rate-distortion cost $RDC_k$ is given by the Lagrangian:

$$RDC_k = D_k + \lambda_k \cdot R_k$$

where $D_k$ is a metric relative to a candidate interpolation coding mode $CICM_k$, $R_k$ a bit rate for encoding a candidate interpolation coding mode $CICM_k$ and $\lambda_k$ a Lagrange multiplier relative to said candidate interpolation coding mode $CICM_k$.

Regarding the Lagrange multiplier $\lambda_k$, high values for this multiplier strongly penalize the bitrate $R_k$ and lead to a low quality of coding, while low values for this multiplier allows easily high values for the bitrate $R_k$ and lead to high quality of coding. This multiplier could be correlated to a quantization parameter (QP) used for images coding. Typical values for this multiplier are in the range from a few hundreds, for very poor coding, to a tenth of unity for good coding. These values are indicative and may also depend on the video content.

According to an embodiment of step 130, the interpolation coding mode ICM may be the candidate interpolation coding mode $CICM_k$ associated with the lowest rate-distortion cost $RDC_k$.

According to an embodiment of step 130, said rate-distortion cost $RDC_k$ is based on a metric indicating spatial distances between $I_k$ interpolation points $PI_k(i,0)$ and N other points P(n,0).

According to an embodiment, the metric D.sub.k is given by:

$$D_k = \text{Max}(dist_{point}(A, B); dist_{point}(B, A))$$

with $$dist_{point}(A, B) = \sum_{p \in A} \|P(n, 0) - \text{closest}(P(n, 0), B)\|_2^2$$

where $\|\ \|_2^2$ is a metric indicating a spatial distance between a point P(n,0) of a set of points A and the closest interpolation point $PI_k(i,0)$ of a set of points B. For example, the Euclidean distance is used as metric, and the closest point P(n,0) of B in A is an interpolation point $PI_k(i,0)$ defined as:

$$\text{closest}(P(n, 0), B) = \operatorname*{argmin}_{i=1, \ldots, Ik} \|P(n, 0) - Plk(i, 0)\|_2^2.$$

The distance $dist_{point}(A,B)$ ensures that the reconstructed points are not too far from the first points, avoiding coding irrelevant points. The distance $dist_{point}(B, A)$ ensures that the first points are not too far from the reconstructed points.

According to a variant, the method comprises removing of duplicates in the set A before computing the rate-distortion cost.

According to an embodiment of step 130, at least one candidate interpolation coding mode $CICM_k$ is defined by creating at least one interpolation point $PI_k(i,0)$ having an associated depth value ranging from the depth value of the reconstructed point $\overline{P_0(p)}$ up to a maximum depth value.

According to a variant of said embodiment of step 130, illustrated in FIG. 2, at least one candidate interpolation coding mode $CICM_k$ is defined as follows.

In step 1300, a maximum depth difference (distance) $\text{deltaMax}(\overline{P_0(p)})$ is calculated between the depth value D($\overline{P_0(p)}$) associated with a reconstructed p point $\overline{P_0(p)}$ and the depths D(n,0) of at least one-point P(n,0):

$$\text{deltaMax}(\overline{P_0(p)}) = \max(D(\overline{P_0(p)}) - D(n,0)) \text{ for } n=0, \ldots N$$

According to a variant, the difference between $D(\overline{P_0(p)})$ and D(n,0) is ignored if it does belong to a given range of values defined by a lower bound LB and an upper bound UB. For example, LB=0 and UB=4.

When none difference belongs to the given range of values, the maximum depth difference $\text{deltaMax}(\overline{P_0(p)})$ may be set to 1.

More than on candidate interpolation coding mode $CICM_k$ may then be determined by choosing different values of LB and UB for example. In that case the bounds LB and UB do not have to be transmitted because a decoder knows beforehand what are those values according to a specific value of the interpolation coding mode $ICM_k$.

Typically, a candidate interpolation mode may be defined with LB=0 and UB=1, another with LB=0 and UB=2, another one with LB=0 and UB=4.

In step 1310, at least one interpolation point is created according to the maximum depth difference (distance) $\text{deltaMax}(\overline{P_0(p)})$.

Figure 3:
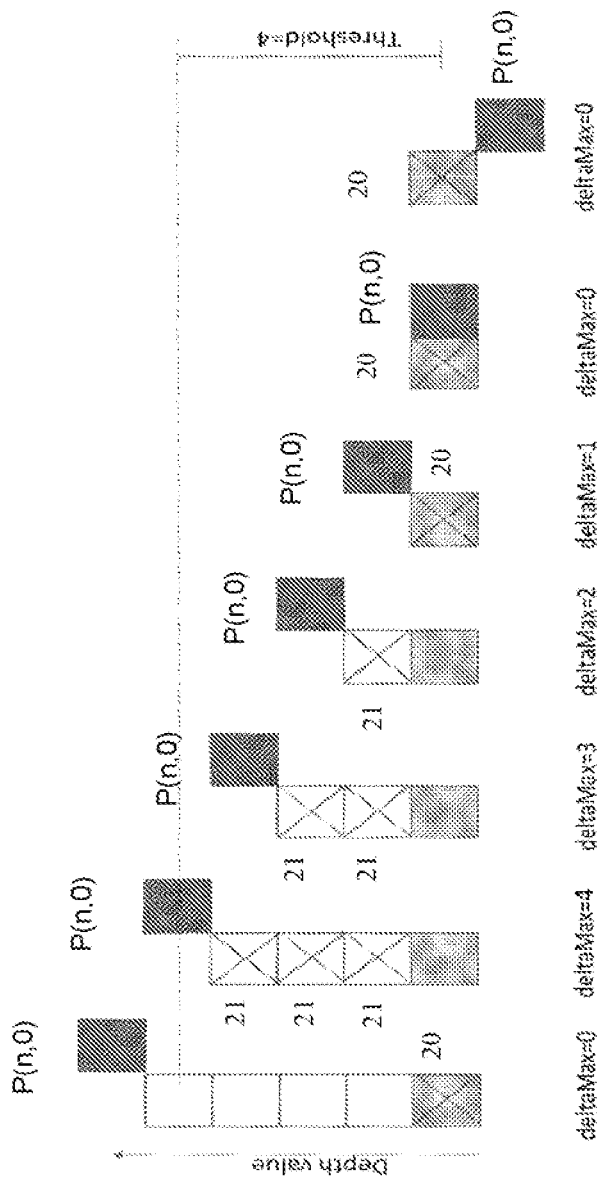
FIGS. 3, 3a illustrate embodiments of candidate interpolation coding mode in accordance with an example of the present embodiments.

According to a variant of step 1310, illustrated in FIG. 3 when UB (threshold)=4, all the created interpolation points are aligned with the reconstructed point $\overline{P_0(p)}$ and a step size of 1 being used for assigning successively a depth value to a new interpolation point.

In more details, at least one interpolation point is created as follows:

If $\text{deltaMax}(\overline{P_0(p)})$ equals 0 or 1, then creating a single interpolation point at the same location p as $\overline{P_0(p)}$ and with the same depth value. In FIG. 3, crosses 20 overlapping the point $\overline{P_0(p)}$.

If $\text{deltaMax}(\overline{P_0(p)})$ is larger than 1, then creating at least one interpolation point at the same location p as $\overline{P_0(p)}$, each created interpolation point having an associated depth value ranging from the depth value of the reconstructed point $\overline{P_0(p)}$ up to a maximum depth value, a step size of 1 being used for assigning successively a depth value to a new created interpolation point.

In the FIG. 3, interpolation points are represented by crosses 21.

Note on FIG. 3, only a single point P(n,0) is shown for clarity purpose.

Figure 3A:
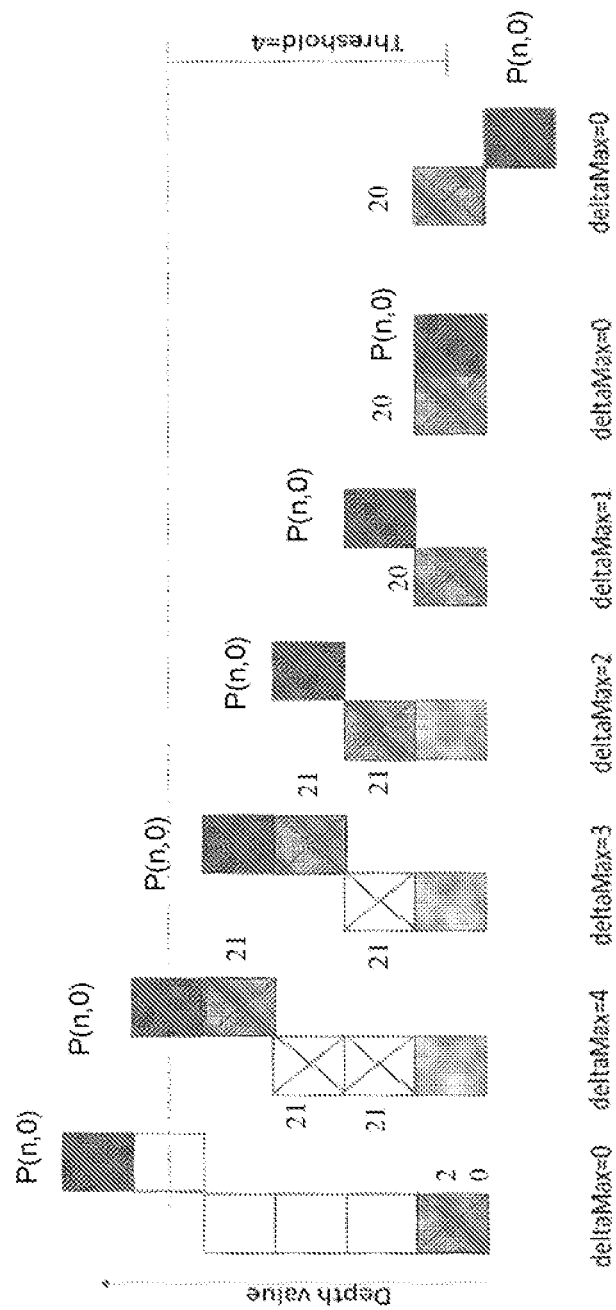

According to a variant, illustrated in FIG. 3a, instead of aligning all interpolation points along the same axis (i.e. on top of the current point), the top half of the interpolation points are aligned with the neighboring point that set the value of deltaMax.

According to a variant, the maximum depth difference is at least equal to a minimum value minDepth:

deltaMax(current)=max($\overline{P_0(p)}$–D(n,0)–minDepth)

where minDepth is a given value that depends on the surface thickness to be reconstructed.

More than on candidate interpolation coding mode $CICM_k$ may then be determined by choosing different values of minDepth, typically 0, 1, or 2.

According to an embodiment of step 130, the rate-distortion cost $RDC_k$ is also based on a metric indicating color distances between colors of the $I_k$ interpolation points $PI_k(i, 0)$ and colors of the N other points P(n,0).

According to an embodiment, the metric $D_k$ is then given by:

$$D_k = \text{Max}(dist_{geo+text}(A, B); dist_{geo+text}(B, A))$$

with $$dist_{geo+text}(A, B) = \frac{dist_{point}(A, B) + \mu * dist_{yuv}(A, B)}{1 + \mu}$$

where μ is a weighting coefficient equals to 0.25 far example, and $$dist_{yuv}(A, B) = \sum_{p \in A} \frac{(6D_y + D_u + D_v)}{8}$$

where $D_y = Y_p - Y_{closest(P(n,0),B)}$ $D_u = U_p - U_{closest(P(n,0),B)}$ $D_v = V_p - V_{closest(P(n,0),B)}$ and the triplets ($Y_p$, $U_p$, $V_p$) designates a color of a point P(n,0) in the YUV color space and the triplets ($Y_{closest(P(n,0),B)}$, $U_{closest(P(n,0),B)}$, $V_{closest(P(n,0),B)}$) designates a color of the closest interpolation point PI.sub.k(i,0) to said point P(n,0) in the YUV color space.

According to an embodiment, at least one candidate interpolation coding mode $CICM_k$ also defines how a color is assigned to at least one interpolation point.

According to an embodiment, a color, assigned to an interpolation point is the color of the closest reconstructed point to said interpolation point.

In a variant, the color, assigned to an interpolation point is a function of colors of neighboring reconstructed points of said interpolation points. Functions means weighted average, maximum or minimum for example.

According to an embodiment of step 110, the neighborhood is an image region, i.e. said at least one-point other point P(n,0) of the point cloud PC associated with a first point P0(p) belongs to an image region.

According to an embodiment, the rate-distortion cost is obtained by adding the rate-distortion costs determined for image sub-regions of said image region.

According to an embodiment, rate-distortion costs are determined for multiple image regions of different shape and/or different size and the shape and/or size of the image region and the interpolation coding mode associated with said lowest rate-distortion cost are selected.

According to an embodiment of step 140, the interpolation coding mode ICM is encoded as a metadata associated with an image region.

In a variant, the difference between two interpolation coding modes assigned to two distinct image regions is encoded as metadata.

For instance, per patch, each mode $RDC_k$ (or a difference of two $RDC_k$) is signaled for each patch k in the bitstream BT as follows:

| For all patches | |
| --- | --- |
| U0 | DecodeUInt32(bitCountU0) |
| V0 | DecodeUInt32(bitCountV0) |
| U1 | DecodeUInt32(bitCountU1) |
| V1 | DecodeUInt32(bitCountV1) |
| D1 | DecodeUInt32(bitCountD1) |
| deltaSizeU0 | DecodeExpGolomb( ) |
| deltaSizeV0 | DecodeExpGolomb( ) |
| Normal Axis | Decode |
| $M_k$ | Decode | where U0, V0, V1, U1, delataSizeU0 and deltaSizeV0 and NormaAxis are syntax elements defined by TMC2.

For instance, per block, each mode $RDC_k$ (or a difference of two $RDC_k$) is signaled for each block k in bitstream BT:

| For all blocks | |
| --- | --- |
| If number of candidate patches > 1 | |
|   Candidate index | Decode |
|   If Candidate index == maxCandidateCount | |
|     block to patch index | DecodeUInt32(bitCountPatch) |
|   Else | |
|     Block to patch index = Candidate index | |
| If (block to patch index != 0) | |
|   $RDC_k$ | Decode | where «number of candidate patches", "Candidate index", "maxCandidateCount", "block to patch index" and block to patch index are syntax elements defined by TMC2.

Figure 4:
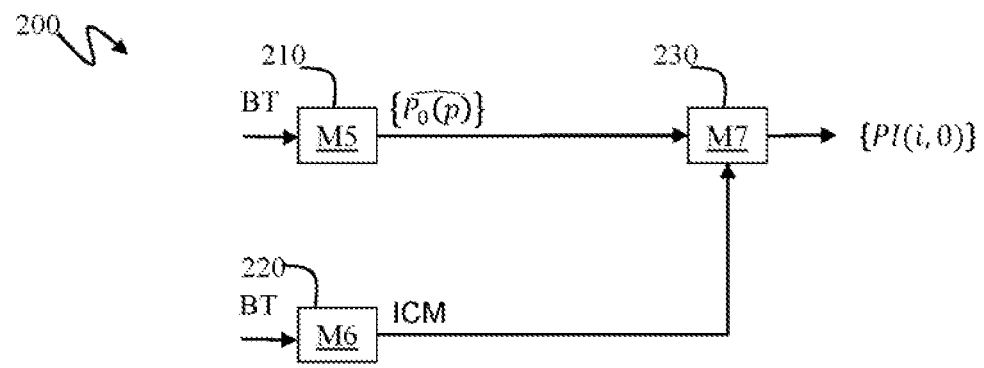
FIG. 4 shows schematically a diagram of the steps of the method 200 for decoding a first depth image and a second depth image from a bitstream in accordance with an example of the present embodiments.

FIG. 4 shows schematically a diagram of the steps of the method 200 for decoding depth values of point of a point cloud from a bitstream in accordance with an example of the present embodiments.

In step 210, a module M5 obtains at least one reconstructed point $\overline{P_0(p)}$ from the bitstream BT.

According to an embodiment of step 210, the module M5 obtains a decoded first depth image $\overline{D_0}$. by decoding the bitstream BT and considers at least one reconstructed point $\overline{P_0(p)}$ relative to at least one pixel of said decoded first depth image $\overline{D_0}$.

In step 220, a module M6 obtains at least one interpolation coding mode ICM from the bitstream BT, an interpolation coding mode ICM indicating how at least one point in a neighborhood of said at least one reconstructed points is approximated by at least one other interpolation point.

According to an embodiment of step 220, at least one interpolation coding mode ICM is obtained from a metadata extracted from the bitstream BT.

In step 230, a module M7 creates at least one interpolation point PI(i,0) for at least one reconstructed point $\overline{P_0(p)}$ and according to said at least one interpolation coding mode ICM, a depth value being associated with each of said at least one interpolation point.

A reconstructed point cloud is then obtained from the reconstructed points $\overline{P_0(p)}$ and the interpolation points PI(i, 0).

According to an embodiment of step 230, the depth values associated with said at least one interpolation points range from the depth value of a reconstructed point $\overline{P_0(p)}$up to a maximum depth value.

According to an embodiment, all the created interpolation points relative to a reconstructed point $\overline{P_0(p)}$ are aligned with the reconstructed point custom-character and a step size of 1 being used for assigning successively a depth value to a new interpolation point.

Figure 2:
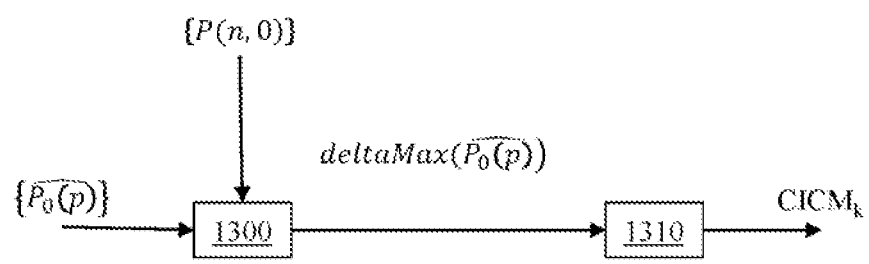
FIG. 2 shows schematically a diagram of an embodiment of step 130 in accordance with an embodiment of the present embodiments.

According to a variant of said embodiment of step 230, at least one interpolation point is created according to a variant of the embodiment of step 130 as illustrated in FIG. 2.

According to an embodiment of the method, in step 210, the method further comprises obtaining at least one image region comprising at least one at least one reconstructed point $\overline{P_0(p)}$.

In step 220, an interpolation coding mode ICM is then obtained per image region from the bitstream BT, said interpolation coding mode ICM indicating how points in an image region are approximated by at least one other interpolation point.

In step 230, at least one interpolation point per image region is then created according to the interpolation coding mode ICM associated with said image region, and a depth value is associated with each of said at least one interpolation point.

Figure 5:
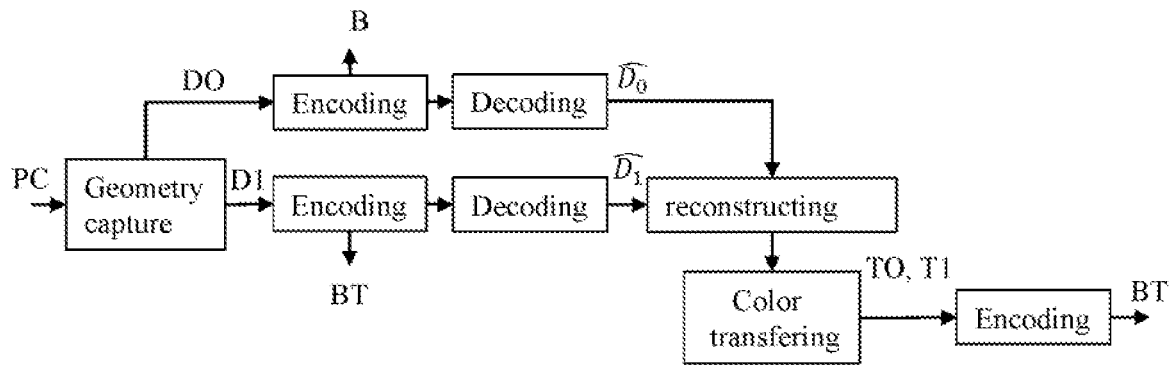
FIG. 5 shows schematically the method for encoding the geometry and texture of a point cloud as defined in prior art (TMC2)

FIG. 5 shows schematically the method for encoding the geometry and texture of a point cloud as defined in TMC2.

Basically, the encoder captures the geometry information of the point cloud PC in a first (D0) and a second (D1) depth images.

As an example, the first and second depth images are obtained as follows in TMC2.

Depth patches (set of 3D points of the point cloud PC) are obtained by clustering the points of the point cloud PC according to the normal vectors at these points. All the extracted depth patches are then projected onto a 2D grid and packed while trying to minimize the unused space, and guaranteeing that every T×T (e.g., 16×16) block of the grid is associated with a unique patch, where T is a user-defined parameter that signaled into the bitstream.

Depth images are then generated by exploiting the 3D to 2D mapping computed during the packing process, more specifically the packing position and size of the projected area of each patch. More precisely, let H(u,v) be the set of points of the current patch that get projected to the same pixel (u, v). A first layer, also called the nearest layer or the first depth image D0, stores the point of H(u,v) with the smallest depth value. The second layer, referred to as the farthest layer or the second depth image D1, captures the point of H(u,v) with the highest depth value within the interval [D, D+Δ], where D is a depth value of pixels in the first depth image D0 and Δ is a user-defined parameter that describes the surface thickness.

A first depth image D0 then outputs the packing process. A padding process is also used to fill the empty space between patches in order to generate a piecewise smooth first depth image suited for video compression.

The generated depth images/layers DO and D1 are then stored as video frames and compressed using any legacy video codec such as HEVC.

The encoder also captures the texture information of the original point cloud PC in a two texture images by encoding/decoding the first and second depth images and reconstructing the geometry of the point cloud by deprojecting said decoded first and second depth point $\overline{D_0}$, $\overline{D_1}$. Once reconstructed, a color is assigned (color transferring) to each point of the reconstructed point cloud from the color information of the original point cloud PC in a manner of minimizing color information coding error.

According to one embodiment, for each reconstructed point, the color of its nearest point in the original point cloud is assigned as its color to be coded.

A first and a second texture images T0, T1 are then generated by storing the color information to be coded of each reconstructed point in the same position as in the depth images, i.e. (i,u,v).

Figure 6:
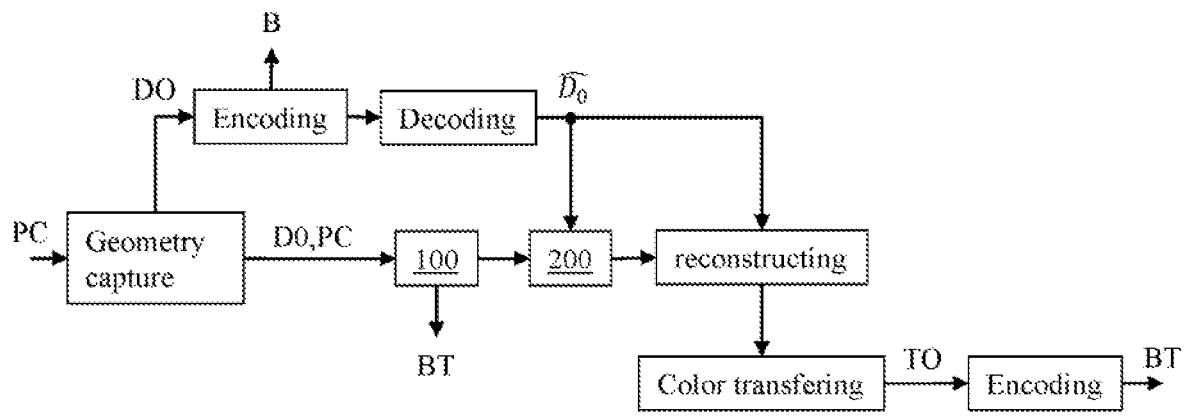
FIG. 6 shows schematically an example of use of the methods 100 and 200 in the encoding method of FIG. 5.

FIG. 6 shows schematically an example of use of the methods 100 and 200 in the encoding method of FIG. 5.

According to this example, the encoding of the second depth image D1 of FIG. 5 is replaced by the encoding method 100 of FIG. 1, and the decoding of the second depth image $\overline{D_1}$ of FIG. 5 is replaced by the decoding method 200 of FIG. 4.

Figure 6A:
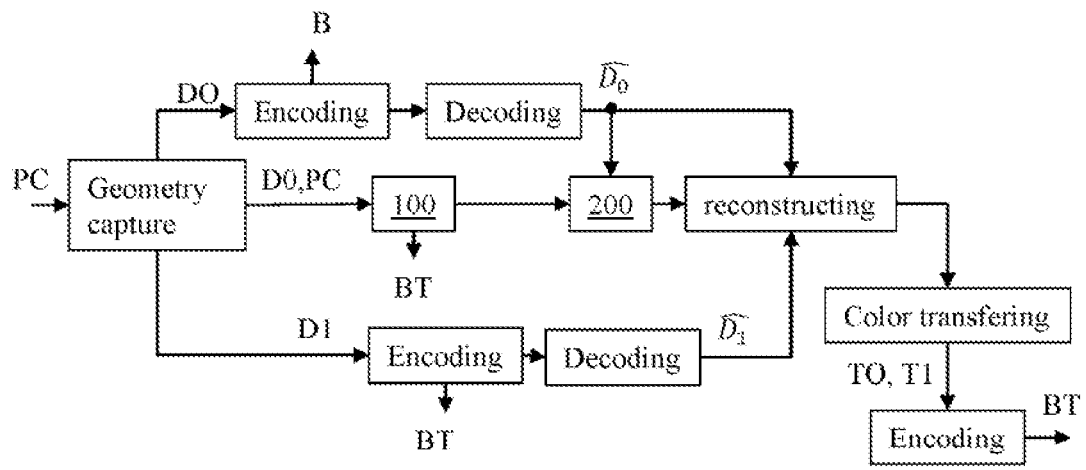
FIG. 6a shows a variant of FIG. 6.

In a variant, illustrated in FIG. 6a, the encoding of the first and the second depth image of FIG. 5 is associated with the encoding method 100 of FIG. 1, and the decoding of the first and second depth image of FIG. 5 is associated with the decoding method 200 of FIG. 4.

Figure 7:
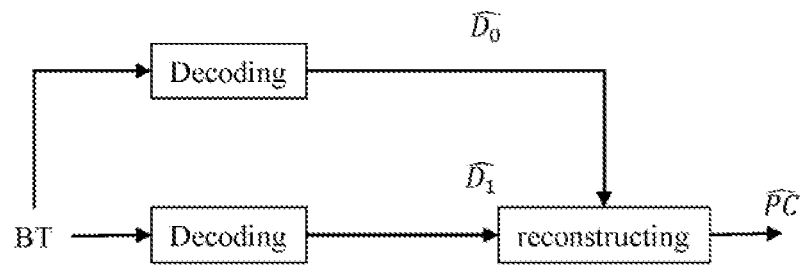
FIG. 7 shows schematically the method for decoding the geometry and texture of a point cloud as defined in prior art (TMC2)

FIG. 7 shows schematically the method for decoding the geometry and texture of a point cloud as defined in prior art (TMC2).

A decoded first depth image $\overline{D_0}$ and a decoded second depth image $D_1$ are obtained by decoding the bitstream BT. Possibly metadata are also decoded to reconstruct the geometry of the point cloud PC.

The geometry of the point cloud is thus reconstructed by deprojection said decoded first and second depth images and possibly said metadata.

Figure 8:
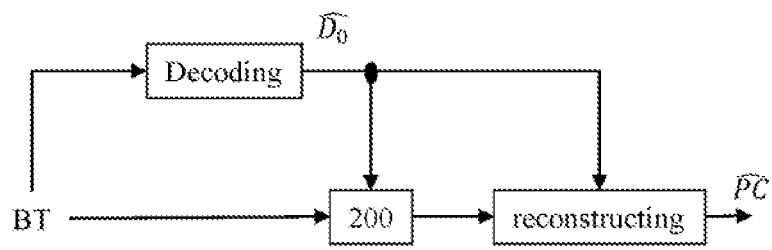
FIG. 8 shows schematically an example of use of the method 200 in the decoding method of FIG. 7.

FIG. 8 shows schematically an example of use of the method 200 in the decoding method of FIG. 7.

According to this example the decoding of the first and second depth images of FIG. 7 is replaced by the decoding method of FIG. 4.

Figure 8A:
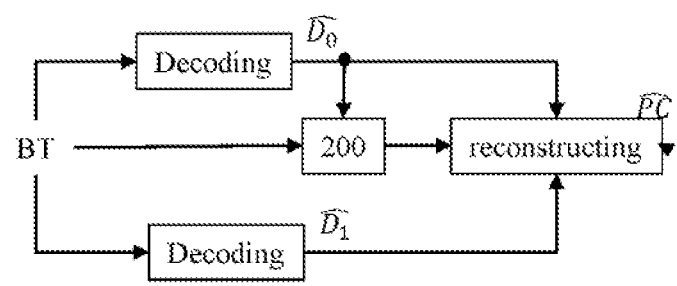
FIG. 8a shows a variant of FIG. 8.

In a variant, illustrated in FIG. 8a, the decoding of the first and second depth image of FIG. 7 is associated with the decoding method 200 of FIG. 4.

On FIG. 1-8a, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present embodiments are implemented using either pure hardware, for example using dedicated hardware such ASIC or FPGA or VLSI, respectively «Application Specific Integrated Circuit», «Field-Programmable Gate Array», «Very Large-Scale Integration», or from several integrated electronic components embedded in a device or from a blend of hardware and software components.

Figure 9:
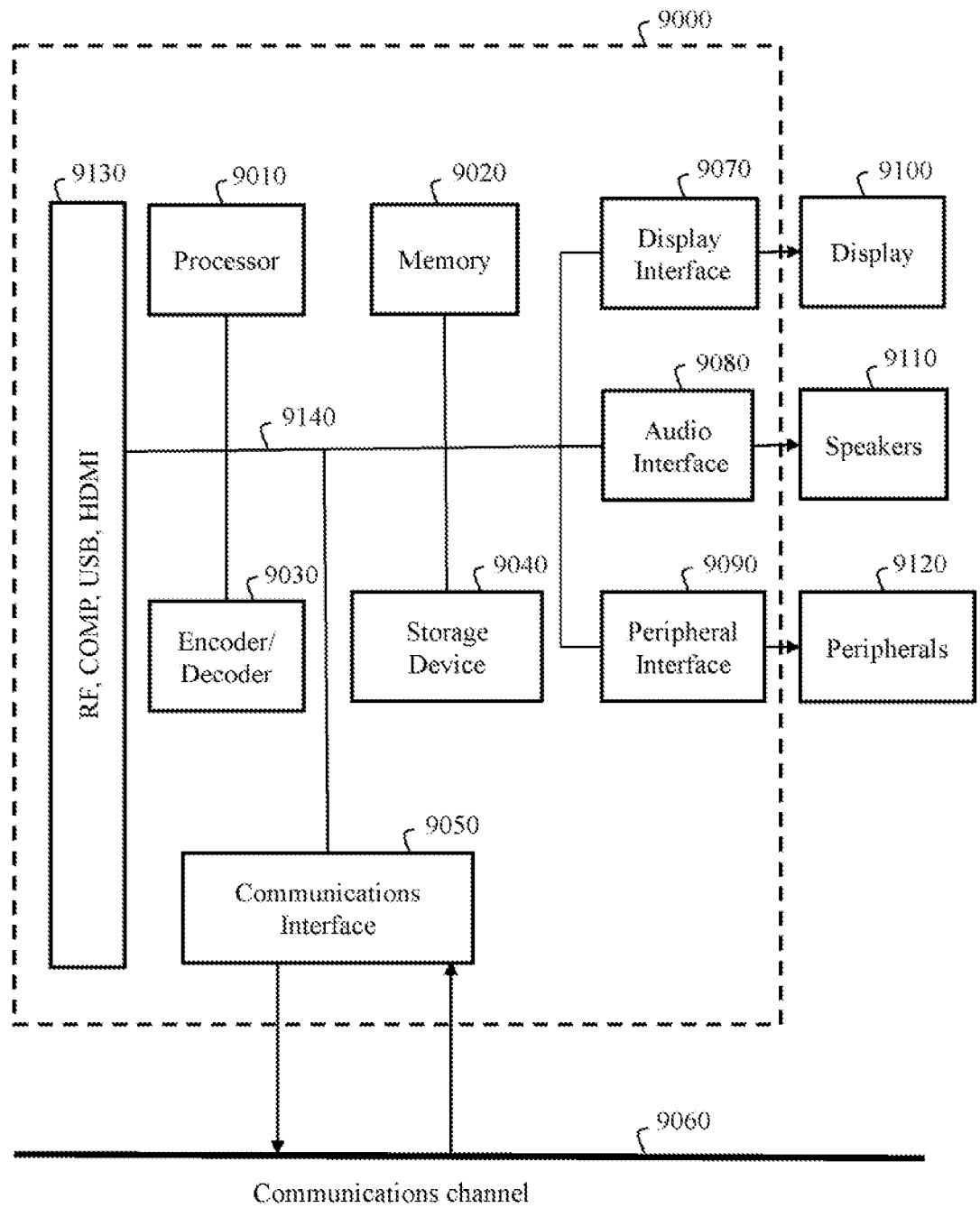
FIG. 9 illustrates a block diagram of an example of a system in which various aspects and embodiments are implemented in accordance with an example of present embodiments.

FIG. 9 illustrates a block diagram of an example of a system in which various aspects and embodiments are implemented. System 9000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 9000, singly or in combination, can be embodied in a single integrated circuit, multiple ICs, and/or discrete components. For example, in at least one embodiment, the processing and encoder/decoder elements of system 9000 are distributed across multiple ICs and/or discrete components. In various embodiments, the system 9000 is communicatively coupled to other similar systems, or to other electronic devices, via, for example, a communications bus or through dedicated input and/or output ports. In various embodiments, the system 9000 is configured to implement one or more of the aspects described in this document.

The system 9000 includes at least one processor 9010 configured to execute instructions loaded therein for implementing, for example, the various aspects described in this document. Processor 9010 can include embedded memory, input output interface, and various other circuitries as known in the art. The system 9000 includes at least one memory 9020 (e.g., a volatile memory device, and/or a non-volatile memory device). System 9000 includes a storage device 9040, which can include non-volatile memory and/or volatile memory, including, but not limited to, EEPROM, ROM, PROM, RAM, DRAM, SRAM, flash, magnetic disk drive, and/or optical disk drive. The storage device 9040 can include an internal storage device, an attached storage device, and/or a network accessible storage device, as non-limiting examples. System 9000 includes an encoder/decoder module 9030 configured, for example, to process data to provide an encoded video or decoded video, and the encoder/decoder module 9030 can include its own processor and memory. The encoder/decoder module 9030 represents module(s) that can be included in a device to perform the encoding and/or decoding functions. As is known, a device can include one or both of the encoding and decoding modules. Additionally, encoder/decoder module 9030 can be implemented as a separate element of system 9000 or can be incorporated within processor 9010 as a combination of hardware and software as known to those skilled in the art.

Program code to be loaded onto processor 9010 or encoder/decoder 9030 to perform the various aspects described in this document can be stored in storage device 9040 and subsequently loaded onto memory 9020 for execution by processor 9010. In accordance with various embodiments, one or more of processor 9010, memory 9020, storage device 9040, and encoder/decoder module 9030 can store one or more of various items during the performance of the processes described in this document. Such stored items can include, but are not limited to, the input video, the decoded video, the point cloud, the reconstructed point cloud or portions of the decoded video, the bitstream, matrices, variables, and intermediate or final results from the processing of equations, formulas, operations, and operational logic.

In several embodiments, memory inside of the processor 9010 and/or the encoder/decoder module 9030 is used to store instructions and to provide working memory for processing that is needed during encoding or decoding.

In other embodiments, however, a memory external to the processing device (for example, the processing device can be either the processor 9010 or the encoder/decoder module 9030) is used for one or more of these functions. The external memory can be the memory 9020 and/or the storage device 9040, for example, a dynamic volatile memory and/or a non-volatile flash memory. In several embodiments, an external non-volatile flash memory is used to store the operating system of a television. In at least one embodiment, a fast-external dynamic volatile memory such as a RAM is used as working memory for video coding and decoding operations, such as for MPEG-2, HEVC, VVC (Versatile Video Coding) or TMC2.

The input to the elements of system 9000 can be provided through various input devices as indicated in block 9130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 9130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 9000 to other electronic devices across USB and/or HDMI connections. It is to be understood that various aspects of input processing, for example, Reed-Solomon error correction, can be implemented, for example, within a separate input processing IC or within processor 9010 as necessary. Similarly, aspects of USB or HDMI interface processing can be implemented within separate interface ICs or within processor 9010 as necessary. The demodulated, error corrected, and demultiplexed stream is provided to various processing elements, including, for example, processor 9010, and encoder/decoder 9030 operating in combination with the memory and storage elements to process the data stream as necessary for presentation on an output device.

Various elements of system 9000 can be provided within an integrated housing. Within the integrated housing, the various elements can be interconnected and transmit data therebetween using suitable connection arrangement, for example, an internal bus as known in the art, including the 120 bus, wiring, and printed circuit boards.

The system 9000 includes communication interface 9050 that enables communication with other devices via communication channel 9060. The communication interface 9050 can include, but is not limited to, a transceiver configured to transmit and to receive data over communication channel 9060. The communication interface 9050 can include, but is not limited to, a modem or network card and the communication channel 9060 can be implemented, for example, within a wired and/or a wireless medium.

Data is streamed to the system 9000, in various embodiments, using a Wi-Fi network such as IEEE 802.11. The Wi-Fi signal of these embodiments is received over the communications channel 9060 and the communications interface 9050 which are adapted for Wi-Fi communications. The communications channel 9060 of these embodiments is typically connected to an access point or router that provides access to outside networks including the Internet for allowing streaming applications and other over-the-top communications.

Other embodiments provide streamed data to the system 9000 using a set-top box that delivers the data over the HDMI connection of the input block 9130.

Still other embodiments provide streamed data to the system 9000 using the RF connection of the input block 9130.

The system 9000 can provide an output signal to various output devices, including a display 9100, speakers 9110, and other peripheral devices 9120. The other peripheral devices 9120 include, in various examples of embodiments, one or more of a stand-alone DVR, a disk player, a stereo system, a lighting system, and other devices that provide a function based on the output of the system 9000.

In various embodiments, control signals are communicated between the system 9000 and the display 9100, speakers 9110, or other peripheral devices 9120 using signaling such as AV.Link, CEC, or other communications protocols that enable device-to-device control with or without user intervention.

The output devices can be communicatively coupled to system 9000 via dedicated connections through respective interfaces 9070, 9080, and 9090.

Alternatively, the output devices can be connected to system 9000 using the communications channel 9060 via the communications interface 9050. The display 9100 and speakers 9110 can be integrated in a single unit with the other components of system 9000 in an electronic device such as, for example, a television.

In various embodiments, the display interface 9070 includes a display driver, such as, for example, a timing controller (T Con) chip.

The display 9100 and speaker 9110 can alternatively be separate from one or more of the other components, for example, if the RF portion of input 9130 is part of a separate set-top box. In various embodiments in which the display 9100 and speakers 9110 are external components, the output signal can be provided via dedicated output connections, including, for example, HDMI ports, USB ports, or COMP outputs.

Figure 10:
FIG. 10 shows two remote devices communicating over a communication network in accordance with an example of present embodiments.

According to an example of the present embodiments, illustrated in FIG. 10, in a transmission context between two remote devices A and B over a communication network NET, the device A comprises a processor in relation with memory RAM and ROM which are configured to implement a method as described in relation with the FIG. 1-3a, or 5-6 and the device B comprises a processor in relation with memory RAM and ROM which are configured to implement a method as described in relation with FIG. 4 or 7-8.

In accordance with an example, the network is a broadcast network, adapted to broadcast still pictures or video pictures from a device A to decoding devices including the device B.

A signal, intended to be transmitted by the device A, carries the bitstream BT. The bitstream BT comprises coded data representing depth values of points of a point cloud, at least one reconstructed point of the point cloud, and at least one interpolation coding mode indicating how at least one point in a neighborhood of said at least one reconstructed point is approximated by at least one other interpolation point.

Said coded data are obtained, for example, as explained in relation with FIG. 1-3a.

Figure 11:
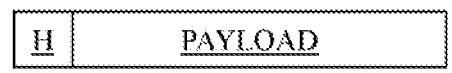
FIG. 11 shows the syntax of a signal in accordance with an example of present embodiments.

FIG. 11 shows an example of the syntax of such a signal when the data are transmitted over a packet-based transmission protocol. Each transmitted packet P comprises a header H and a payload PAYLOAD. A bit of the header H, for example, id dedicated to represent an interpolation coding mode ICM. Thus, at least one bit of the header H is dedicated to represent at least one interpolation coding mode ICM.

An implementation of a spatial adaptive reconstruction mode in TMC2, follows:

1. The possibility of encoding a single depth and texture layer—currently TMC2 always encodes two layers. This is implemented by the addition of an encoder parameter/bit stream parameter to signal, at GOP level, the number of depth & texture layers (equal for both).
2. In the single-layer mode, the use of an optimization framework to locally adapt the point reconstruction mode, called Point Local Reconstruction Mode (PLRM), to the characteristics of the point cloud. The optimization is performed using an RDO-like approach in the encoder, adding in the bitstream the required signaling so that the decoder is aware of the local reconstruction mode to use per point. This is done at a region size (block at occupancy map resolution, 16 by 16 pixels in the contribution). This process is named Point Local Reconstruction Framework (PLRF).

Signaling the PLRM requires a dedicated arithmetic encoder, increasing the complexity of the encoder and decoder.

At least one embodiment is about to transport (signal) the data on the point local reconstruction mode, PLRM, that is at least one interpolation coding mode, as image data.

Each predicted mode is coded into the block to patch metadata information which is coded into the auxiliary patch information (using an arithmetic encoder). The current implementation tries up to 10 different modes. The FIG. 12 shows the different modes decided on the encoder side and the distribution of the use of each mode into TMC2 v3.0 software regarding the rates and configurations (All Intra mode, Random access Mode).

In the implementation, data concerning the PLRM is sent to the decoder using the block to patch metadata and is encoded by an arithmetic encoder.

The occupancy map (at occupancy map precision B0×B0 blocks, i.e. 4 by 4 pixels) is coded as a video (using HEVC). It consists of a binary map that indicates for each cell of the grid whether it belongs to the empty space or to the point cloud. The use of the occupancy map could be extended in the case of the PLRF in order to transport (signal) such information.

At least one pf the present embodiment relates to a way to code the PLRM into the occupancy map as it is the most probable mode that could be used to code such information in current TMC2.

The main idea is to show a way of how the occupancy map could be used to transport information concerning the Point Local Reconstruction Mode. Up to now, the occupancy map contains "0" to indicate the corresponding 3D-block (point cloud) is empty or "1" to indicate the 3D-block is fully occupied as shown in FIG. 12. At least one of the embodiment gets more values to indicate the PLRM.

In more details, at least one of the present embodiments relates to the following method:

For each block at occupancy map precision (4*4), the PLRM is set as follow:
  If the block is empty, the block is set to 0.
  If the block is occupied, then the value assigned to the block corresponds to the point local reconstruction mode in the range [1 . . . N], N being the maximum number of point local reconstruction modes to apply. Note, that the "1" value still indicated the block is occupied and no supplementary point is added to the reconstructed point cloud with this mode.

In accordance with an implementation, as the point local reconstruction mode is on occupancy map resolution (16*16), then the information on each block at occupancy map precision (4*4) is repeated unless the block is unoccupied and is set to 0 in that case.

FIG. 13a shows an example how PLRM could be coded into the occupancy map with the example of FIG. 13. It shows the use of four modes "1", "2", "5" and "7". "0" means the reconstructed block is empty.

Note that the PLRM could be done at the occupancy precision (4*4). In that case, the coded information of the PLRM could differ from block to block as shown in FIG. 13b. It will bring more preciseness on the reconstruction process.

A variant of the PLRM coding is to assign value ranges for different kind of reconstruction (PLRM and other way of reconstruction that could be applied): 191 If the block is empty, the block is set to 0 (as today). 192 If the block is occupied, a first range]0; mis reserved to assign a PLRM and a second range]m; Nto assign an information describing another method of the point cloud reconstruction.

Another variant of the implementation is to use a bit mask:
  If the block is empty, the block is set to 0 (as today).
  If the block is occupied, we use the N bit of the component by:
    Assigning the PLRM to the first n bit
    Assigning the (N−n) bits to indicate the other reconstruction mode As an example, with a component coded on 10 bits, 4 bits are used to code information "I", and the 6 other bits to code the PLRM information.

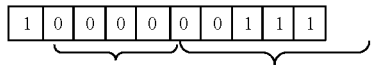

Another variant of the implementation is to use a hash map to determine the different PLRM. It could specify a PLRM for each layer.

As an example, if $PLRM_0$ is the reconstruction coding mode for layer 0, PLRM, is the reconstruction coding mode for layer 1 and $PLRM_2$ is the reconstruction coding mode for layer 2, the occupancy map could be filled as following:
  If the block is empty, the block is set to 0 (as today).
  If the block is occupied, the hash table could be the following:

| key | values |
| --- | --- |
| 1 | $PLRM_0$ is 1 |
|  | $PLRM_1$ is 1 |
|  | $PLRM_2$ is 1 |
| 2 | $PLRM_0$ is 2 |
|  | PLRM is 1 |
|  | $PLRM_2$ is 1 |
| ... | ... |
| N | $PLRM_0$ is N |
|  | $PLRM_1$ is N |
|  | $PLRM_2$ is N |

Another variant could be to use the chroma component of the occupancy map to code the PLRM information.

Main advantages are to avoid coding the data into the auxiliary patch information and to take advantage of the video compression of the occupancy map with existing hardware.

It follows the idea to use the occupancy map information as a collector on how point cloud is reconstructed. Note, it is the most probable case on how point local reconstruction modes could be transported inside TMC2.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present embodiments, or to carry as data the actual syntax-values written by a described example of the present embodiments. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining a reconstructed 2D point from a first 2D point obtained by projecting a 3D point of a point cloud onto a projection plane;
determining an interpolation coding mode based on a rate-distortion cost associated with at least one candidate interpolation coding mode, the at least one candidate interpolation coding mode defining a neighborhood around the reconstructed 2D point and a minimum depth value that provide for reconstructing at least one 2D interpolation point based on the reconstructed 2D point, the at least one 2D interpolation point approximating at least one other 2D point of the point cloud, wherein at least two interpolation coding modes are determined by different values of the minimum depth value,
encoding the determined interpolation coding mode.

2. The method of claim 1, wherein the interpolation coding mode is signaled per block or patch of the point cloud.

3. The method of claim 1, wherein the method further comprises assigning depth values of the first 2D point to a pixel value of a first depth image, obtaining an encoded first depth image by encoding the first depth image, and obtaining a decoded first depth image by decoding the encoded first depth image, the reconstructed 2D point being a pixel of the decoded first depth image.

4. The method of claim 1, wherein the rate-distortion cost associated with the at least one candidate interpolation coding mode is based on a metric indicating spatial distances between said at least one 2D interpolation point defined according to said candidate interpolation coding mode and said at least one other 2D point.

5. The method of claim 4, wherein the rate-distortion cost associated with the at least one candidate interpolation coding mode is also based on a metric indicating color distances between colors of said at least one 2D interpolation point defined according to said candidate interpolation coding mode and colors of said at least one other 2D point.

6. The method of claim 4, wherein the metric takes into account on one hand a spatial distance between at least one other 2D point and one of the at least 2D interpolation point that is closest to said at least one other 2D point and on the other hand a spatial distance between at least one 2D interpolation point and one of the at least other 2D point that is closest to said at least one 2D interpolation point.

7. The method of claim 1, wherein at least one candidate interpolation coding mode provides for reconstructing at least one 2D interpolation point having an associated depth value ranging from a depth value of the reconstructed 2D point up to a maximum depth value.

8. The method of claim 1, wherein the neighborhood around the first 2D point is an image region and said at least one other 2D point belongs to said image region.

9. A method comprising:
reconstructing at least one first point of a point cloud encoded in a bitstream,
decoding at least one interpolation coding mode from the bitstream, said interpolation coding mode defining a neighborhood around the at least one first point and a minimum depth value, wherein at least two different values of the minimum depth value provide at least two distinct interpolation coding modes,
reconstructing at least one 2D interpolation point of the point cloud based on the at least one first point and the neighborhood and the minimum depth value defined by the decoded interpolation coding mode.

10. The method of claim 9, wherein the interpolation coding mode is signaled per block or patch of the point cloud.

11. The method of claim 9, wherein a depth value associated with the at least one 2D interpolation point ranges from a depth value of the at least one first point up to a maximum depth value.

12. The method of claim 11, wherein the depth value associated with the at least one 2D interpolation point is determined according to the minimum depth value and to a maximum depth difference determined between a decoded depth of the at least one first point and a depth of at least one point in the neighborhood.

13. The method of claim 9, wherein said interpolation coding mode comprises data representative of a number of elements of the neighborhood.

14. A device comprising at least one processor configured to:
- obtain a reconstructed 2D point from a first 2D point obtained by projecting a 3D point of a point cloud onto a projection plane;
- determine an interpolation coding mode based on a rate-distortion cost associated with at least one candidate interpolation coding mode, the at least one candidate interpolation coding mode defining a neighborhood around the reconstructed 2D point and a minimum depth value that provide for reconstructing at least one 2D interpolation point based on the reconstructed 2D point, the at least one 2D interpolation point approximating at least one other 2D point of the point cloud, wherein at least two interpolation coding modes are determined by different values of the minimum depth value,
- encode the determined interpolation coding mode.

15. The device of claim 14, wherein the rate-distortion cost associated with the at least one candidate interpolation coding mode is based on a metric indicating spatial distances between said at least one 2D interpolation point defined according to said candidate interpolation coding mode and said at least one other 2D point.

16. The device of claim 15, wherein the rate-distortion cost associated with the at least one candidate interpolation coding mode is also based on a metric indicating color distances between colors of said at least one 2D interpolation point defined according to said candidate interpolation coding mode and colors of said at least one other 2D point.

17. The device of claim 15, wherein the metric takes into account on one hand a spatial distance between at least one other 2D point and one of the at least 2D interpolation point that is closest to said at least one other 2D point and on the other hand a spatial distance between at least one 2D interpolation point and one of the at least other 2D point that is closest to said at least one 2D interpolation point.

18. A device comprising at least one processor configured to:
- reconstruct at least one first point of a point cloud encoded in a bitstream,
- decode at least one interpolation coding mode from the bitstream, said interpolation coding mode defining a neighborhood around the at least one first point and a minimum depth value, wherein at least two different values of the minimum depth value provide at least two distinct interpolation coding modes,
- reconstruct at least one 2D interpolation point of the point cloud based on the at least one first point and the neighborhood and the minimum depth value defined by the decoded interpolation coding mode.

19. The device of claim 18, wherein a depth value associated with the at least one 2D interpolation point ranges from a depth value of the at least one first point up to a maximum depth value.

20. A non-transitory computer-readable medium including instructions for causing one or more processors to perform:
- obtaining a reconstructed 2D point from a first 2D point obtained by projecting a 3D point of a point cloud onto a projection plane;
- determining an interpolation coding mode based on a rate-distortion cost associated with at least one candidate interpolation coding mode, the at least one candidate interpolation coding mode defining a neighborhood around the reconstructed 2D point and a minimum depth value that provide for reconstructing at least one 2D interpolation point based on the reconstructed 2D point, the at least one 2D interpolation point approximating at least one other 2D point of the point cloud, wherein at least two interpolation coding modes are determined by different values of the minimum depth value,
- encoding the determined interpolation coding mode.

21. A non-transitory computer-readable medium including instructions for causing one or more processors to perform:
- reconstructing at least one first point of a point cloud encoded in a bitstream,
- decoding at least one interpolation coding mode from the bitstream, said interpolation coding mode defining a neighborhood around the at least one first point and a minimum depth value, wherein at least two different values of the minimum depth value provide at least two distinct interpolation coding modes,
- reconstructing at least one 2D interpolation point of the point cloud based on the at least one first point and the neighborhood and the minimum depth value defined by the decoded interpolation coding mode.

* * * * *